United States Patent [19]

Thomas, deceased

[11] Patent Number: 5,386,563

[45] Date of Patent: Jan. 31, 1995

[54] REGISTER SUBSTITUTION DURING EXCEPTION PROCESSING

[75] Inventor: Alasdair R. P. Thomas, deceased, late of Cambridge, Great Britain, by Gerard W. A. Chadwick, administrator

[73] Assignee: Advanced Risc Machines Limited, Swaffam Bulbeck, United Kingdom

[21] Appl. No.: 959,711

[22] Filed: Oct. 13, 1992

[51] Int. Cl.⁶ .............................................. G06F 13/00
[52] U.S. Cl. ................................... 395/650; 395/725; 364/DIG. 1; 364/247; 364/280.8; 364/263.2
[58] Field of Search ................... 395/650; 364/DIG. 1

[56] References Cited

U.S. PATENT DOCUMENTS

| | | | |
|---|---|---|---|
| 4,217,638 | 8/1980 | Namimoto et al. | 364/200 |
| 4,434,461 | 2/1984 | Puhl | 364/200 |
| 4,812,967 | 3/1989 | Hirosawa et al. | 364/200 |
| 4,905,196 | 2/1990 | Kirrman | 365/200 |
| 4,970,641 | 11/1990 | Hester et al. | 364/200 |
| 5,095,426 | 3/1992 | Senta | 395/375 |
| 5,115,506 | 5/1992 | Cohen et al. | 395/725 |
| 5,237,700 | 8/1993 | Johnson et al. | 395/775 |

*Primary Examiner*—Kevin A. Kriess
*Assistant Examiner*—Matthew M. Payne
*Attorney, Agent, or Firm*—Woodcock Washburn Kurtz Mackiewicz & Norris

[57] ABSTRACT

A data processing apparatus and method are described in which a CPU is operable in either a main processing mode (User32) or an exception processing mode (e.g. FIQ32). The CPU has a plurality of main data registers (R0 to R15) and a processing status register (CPSR) for use in the main processing mode. Upon entering the exception processing mode at least one exception data register (R8fiq to R14fiq) is substituted for use in place of a respective corresponding one of the main data registers and the data held within the processing status register is stored within a saved processing status register (SPSRfiq). When the exception processing mode is left, the main data registers are returned for use in place of the exception data registers and the data stored within the saved processing status register is restored to the processing status register. A plurality of exception processing modes are described each having their own associated exception data registers. When a further differing exception occurs within an exception processing mode, the CPU switches to that further differing exception processing mode and uses its own exception data registers and saved processing status register in place of those of the existing processing mode. In this way, nested exception processing is provided.

22 Claims, 4 Drawing Sheets

REGISTER SUBSTITUTION DURING EXCEPTION PROCESSING

BACKGROUND OF THE INVENTION

1. Field of the Invention

This invention relates to data processing apparatus and a method of operating a data processing apparatus. More particularly, this invention relates to a data processing apparatus that is operable in either a main processing mode or one or more exception processing modes.

2. Description of the Prior Art

It is known to provide central processing units (CPUs) that are operable in both a main processing mode and one or more exception processing modes. The main processing mode is used for execution of the application software for performing the user's desired data processing. The exception processing modes are usually used for operations such as responding to externally applied interrupt signals.

It is desirable that the move between the main processing mode and the exception processing mode should be reversible in that when a return is made to the main processing mode the operation of the main processing mode will continue as if it had not been interrupted. In order to achieve such reversibility, it is necessary that the contents of the various processing registers within the CPU should be saved upon leaving the main processing mode so that they can be restored after the exception processing mode has finished its use of the registers and control is returned to the main processing mode. This is conventionally achieved by saving the contents of the registers in the main processing mode to an area of stack memory in external random access memory (RAM) upon leaving the main processing mode and then returning these contents from the area of stack memory to the registers upon returning to the main processing mode.

A problem with this conventional approach is that the operations of writing to and subsequently reading from a stack memory is relatively slow and thus degrades the performance of the CPU.

Another problem in such conventional approaches is that processing overhead must also be expended to save and restore processing status data (e.g. various status flags specifying the desired/permitted operation of the CPU) when leaving and re-entering the main processing mode.

SUMMARY OF THE INVENTION

It is an object of the invention to reduce the above problems and provide a CPU of a higher processing performance.

Viewed from one aspect, this invention provides a data processing apparatus operable to manipulate data in either a main processing mode or an exception processing mode, said data processing apparatus comprising:

(i) a plurality of main data registers for holding data to be manipulated;

(ii) a processing status register for holding data indicative of processing status;

(iii) at least one exception data register;

(iv) a saved processing status register;

(v) means for substituting for use said at least one exception data register for a respective corresponding one of said main data registers upon entering said exception processing mode;

(vi) means for storing in said saved processing status register said data indicative of processing status in said main processing mode upon entering said exception processing mode;

(vii) means for returning for use said respective corresponding one of said main data registers in place of said at least one exception data register upon leaving said exception processing mode; and (viii) means for restoring said data stored in said saved processing status register to said processing status register upon leaving said exception processing mode.

The provision of at least one exception data register for substituting for use in place of a respective corresponding one of the main data registers has the effect that the exception data register is available for immediate use by the exception handling code without the need to first save the data stored within the corresponding main data register. Furthermore, the data stored within the main data register for which the exception data register is substituted remains in that main data register and is available for immediate use upon re-entering the main processing mode.

It will be appreciated that the substitution of an exception data register for a main data register has the result that the total number of data registers physically present will be greater than the number of registers supported by the instruction set of the data processing apparatus. However, this does not raise a problem since an instruction to address or manipulate a particular register need not take account of whether that register is in fact one of the main data registers or an exception processing register since this substitution can be handled at a different level.

The provision of the special purpose saved processing status register allows a high speed saving and restoring of the data indicative of processing status data and yet remains independent of what that status data is.

In preferred embodiments of the invention there is provided a program counter register for holding data indicative of program position within an executing program; means for storing said data indicative of program position within a currently executing program into one of said at least one exception data register serving as a return address register upon entering said exception handling mode; and means for restoring said data stored in said return address register to said program count register upon leaving said exception processing mode.

The storing of the program counter register contents within one of the exception data registers allows the return address to be directly available within the exception processing mode thus providing a higher speed return from the exception processing mode.

Another preferred feature of some embodiments of the invention is that said plurality of main data registers include a main processing mode stack pointer register for holding data indicative of current address within a stack memory area used by said main processing mode and said at least one exception data register includes an exception processing mode stack pointer register for substituting for said main processing mode stack pointer register in said exception processing mode and for holding data indicative of current address within a stack memory area used by said exception processing mode.

It is usual that one register within the main data registers is used as a stack pointer for the main mode. It is desirable that the exception processing mode should also have access to a stack memory. In order to protect against the position of the stack pointer not being preserved when switching between processing modes, the exception processing mode is provided with its own stack memory area having its own stack pointer stored in an exception processing mode stack register. The substitution of the exception processing mode stack pointer register for the main processing mode stack pointer register ensures the main processing mode stack pointer is preserved and yet allows the exception processing mode to have immediate access to its own stack memory area.

It will be appreciated that exceptions can take more than one form. For example, an exception may arise due to an externally applied interrupt or through a protection violation in a cache memory access attempt. These different sorts of exception require different exception handling routines. In order to deal with this and preserve the advantages of increased speed, preferred embodiments of the invention provide a plurality of exception processing modes each having at least one exception data register and a saved processing status register associated therewith.

When more than one possible exception mode exists, then there is the possibility of an exception occurring when an another exception is already being processed. Conventionally, this is catered for by placing a restriction upon exception handling code so as to prevent any such additional exceptions occurring. This is a stringent requirement that makes the writing of exception handling code difficult. In preferred embodiments of this invention the system can be arranged such that when a further differing exception occurs within an exception processing mode:

said means for substituting substitutes for use said at least one exception data register corresponding to said further differing exception for a respective main data register or exception data register currently in use; and said means for storing stores in said saved processing status register corresponding to said further differing exception said data indicative of processing status in said exception processing mode currently in use.

In accordance with this preferred feature, since the saved processing status register preserves the processing status of the previous mode and enables the system to return to that previous mode with exactly the same processing status data and register contents, it now becomes feasible to efficiently provide for further differing exceptions to occur within an existing exception processing mode. This allows the stringent conditions upon exception handling codes to be relaxed and can be seen to provide a sort of nested exception handling structure.

It will be understood that the exception processing mode or modes that are supported can take a number of forms. In particular, the mode or modes may be selected from the group comprising:

a fast interrupt request mode entered when an externally applied fast interrupt signal is detected and said fast interrupt mode is enabled;

a supervisor mode entered when said data processing apparatus is reset or upon execution of a software interrupt instruction;

an abort mode entered when a memory access is aborted;

a slow interrupt request mode entered when an externally applied slow interrupt signal is detected and said slow interrupt mode is enabled; and an undefined mode entered when an undefined software instruction is encountered.

In the case of a system having a plurality of exception processing modes, some of the exception processing modes will be of a higher priority than others. In this case, preferred embodiments of the invention provide that when said plurality of exception processing modes include one or more high speed exception processing modes and one or more low speed exception processing modes, said one or more high speed exception processing modes having a greater number of associated exception data registers to be made directly available for use upon entering said one or more high speed exception processing modes than said one or more low speed exception processing modes.

The provision of a greater number of exception data registers for the high speed exception processing modes gives them more capacity to carry out whatever exception processing is required with the exception data registers without need, or with a reduced need, to save the contents of the main data registers that are not substituted.

In order to enhance this facility further, preferred embodiments provide a write buffer into which data from said main data registers may be written prior to storage elsewhere, said write buffer having a data storage capacity equal to or greater than an amount of data contained within those main data registors not substituted with exception data registers in said one or more high speed exception processing modes.

The provision of a write buffer that is deep enough to contain the contents of the main data registers not substituted in the high speed exception processing modes allows the entire contents of these main data registers to be treated as saved and exception processing to start immediately without having to wait for this data to be saved using slower speed processes, such as storage in RAM.

In order to enhance this facility still further, preferred embodiments of the invention have means for reading from a plurality of main data registers and exception data registers in response to single store multiple software instruction and means for writing to a plurality of main data registers and exception data registers in response to single load multiple software instruction.

In this way all the main registers not substituted may be transferred to the write buffer with a single instruction.

Another preferred feature that can improve the speed of the high speed exception processing modes is that said one or more high speed exception processing modes commence exception handling code execution directly from an exception vector.

One factor involved in implementing the invention is that the system should have some means of directing instructions to have effect upon the appropriate one of a main data register and a corresponding exception data register depending upon whether a substitution has occurred. An advantageously simple and effective way of achieving this is to provide that said main data registers and said exception data registers are addressed using a register address formed from an instruction portion derived from an executed software instruction and a mode portion derived from at least some bits of said data indicative of processing status stored in said processing status register.

The concatenation of bits of the processing status data with an address derived from an instruction automatically ensures that the appropriate one of a main data register and an exception data register is addressed merely by ensuring that the processing status register is changed to indicate the appropriate one of the main processing modes or exception processing modes that is currently in operation.

Viewed from another aspect this invention provides a method of operating a data processing apparatus to manipulate data in either a main processing mode or an exception processing mode, said data processing apparatus comprising: a plurality of main data registers for holding data to be manipulated; a processing status register for holding data indicative of processing status; at least one exception data register; and a saved processing status register; said method comprising the steps of:

(i) substituting for use said at least one exception data register for a respective corresponding one of said main data registers upon entering said exception processing mode;

(ii) storing in said saved processing status register said data indicative of processing status in said main processing mode upon entering said exception processing mode:

(iii) returning for use said respective corresponding one of said main data registers in place of said at least one exception data register upon leaving said exception processing mode; and (iv) restoring said data stored in said saved processing status register to said processing status register upon leaving said exception processing mode.

The above, and other objects, features and advantages of this invention will be apparent from the following detailed description of an illustrative embodiment which is to be read in connection with the accompanying drawings.

DESCRIPTION OF THE PREFERRED EMBODIMENT

Figure 1:
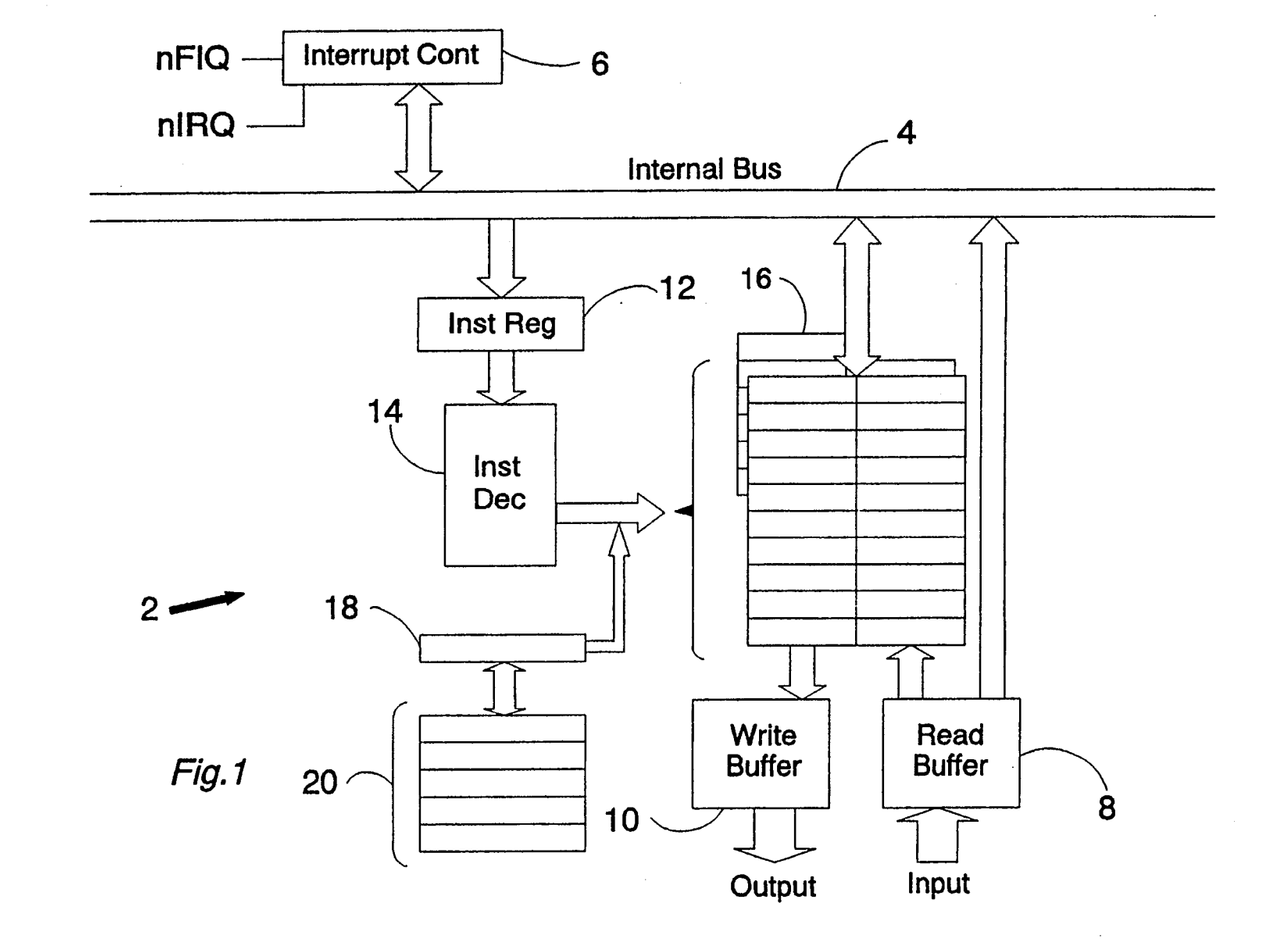
FIG. 1 schematically illustrates a CPU architecture.

FIG. 1 schematically illustrates a part of a CPU 2. The CPU 2 contains an internal bus 4 by which the various portions of the CPU 2 communicate. An interrupt controller 6 is attached to the internal bus 4. The interrupt controller 6 receives external inputs nFIQ and nIRQ that are signal indicating interrupt requests applied to external pins on the CPU package.

An external data bus (not shown) communicates with a read buffer 8 and a write buffer 10 via which data (either data to be manipulated or instruction data) is respectively read into or written out from the CPU. Instruction data read into the read buffer 8 can be fed directly to the internal bus 4 and then to an instruction register 12 where they are stored and then decoded for action by an instruction decoder 14. Data to be manipulated may be input or output from a register bank 16 via the read buffer 8 and write buffer 10 respectively. The data within the registers of a register bank 16 is manipulated under control of decoded instructions using the instruction decoder 14.

A processing status register 18 stores processing status information (e.g. flags indicating whether fast or slow interrupts are allowed) and includes a section indicating the current processing mode of the CPU 2. A bank of saved processing status registers 20 are provided to store a previous set of active processing status data when a change is made between processing modes. Amongst other tasks, the contents of the processing status register 18 are used with a register address from the instruction decoder 14 to produce a composite register address that uniquely identifies one register within the register bank 16 upon which a particular instruction is to be carried out.

Figure 2:
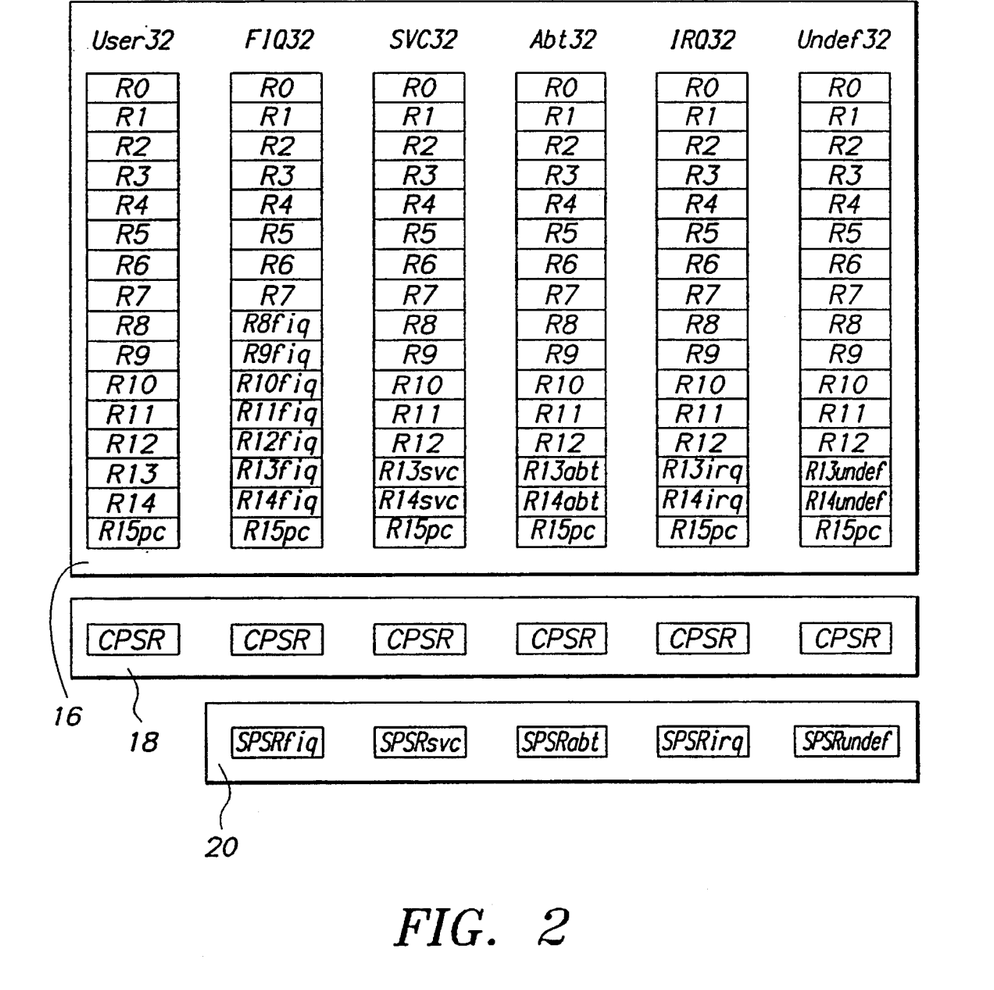
FIG. 2 illustrates the data registers available in a main processing mode and a number of exception processing modes.

FIG. 2 illustrates the different registers available during a main processing mode User32 and various exception processing modes. In the main processing mode fifteen general purpose registers R0 to R14 are provided for data manipulation operations. A program counter register R15pc is provided to serve as a program counter indicating the current position within a sequence of instructions to be executed. A processing status register CPSR stores various flags indicating control parameters of the CPU 2 and five bits indicating the current processing mode. The mode User32 is provided for the execution of user application software.

The remaining five processing modes illustrated are all differing types of exception processing modes. The exception processing modes are:

supervisor (SVC32) which is entered when the processor is reset or a software interrupt instruction is executed;

undefined (Undef32) which is entered when an undefined instruction enters the execution unit;

abort (Abt32) which is entered when the memory system aborts a memory access (either a data access or an instruction prefetch);

interrupt request (IRQ32) entered when the nIRQ pin is held low and the Ibit in the CPSR is clear indicating that such slow interrupt requests are allowed; and a fast interrupt request (FIQ32) entered when the nFIQ pin is held low and the Fbit in the CPSR is clear indicating that such fast interrupts are allowed.

Each of the exception modes SVC32, Abt32, IRQ32 and Undef32 have two exception data registers associated with them that substitute for the main data registers R13 and R14 respectively when one of these modes is entered. R13 is the usual register used to store a stack pointer in both the main processing mode User32 and the exception processing modes. When one of the exception modes is entered the system stores the contents of R15pc in the R14 register of the mode being entered to serve as the return address register. This provides ready access to the return address when the exception handling code for that mode is exited.

Each of the exception handling modes has an associated saved program status register SPSR. These SPSRs save the contents of the CPSR from the previous mode and allow this to be restored to the CPSR when the previous mode is returned to.

The fast interrupt mode FIQ32 has seven exception data registers (R8fiq to R14fiq) as opposed to two exception data registers for the other exception processing modes. The result of this is that exception data registers R8fiq to R12fiq are available for immediate use upon entering the FIQ32 mode. It is also of note that the write buffer 10 of FIG. 1 is the equivalent of eight registers deep and so if the exception handling code of mode FIQ32 requires that the registers R0 to R7 be saved, then this can be achieved in a short time since they can be completely held within the write buffer 10. The CPU is provided with a load muliple instruction and store multiple instruction that allow any set of the sixteen active registers to be loaded and stored (e.g. LDM R1, {R0, R3, R4, R6, R14, R15 pc} loads the registers inside the { } from an area of memory starting at address R1). The instruction decoder 14 controls the operation of the CPU to perform this operation.

Consider the example of moving between the User32 mode and the SVC32 mode.

Figure 4:
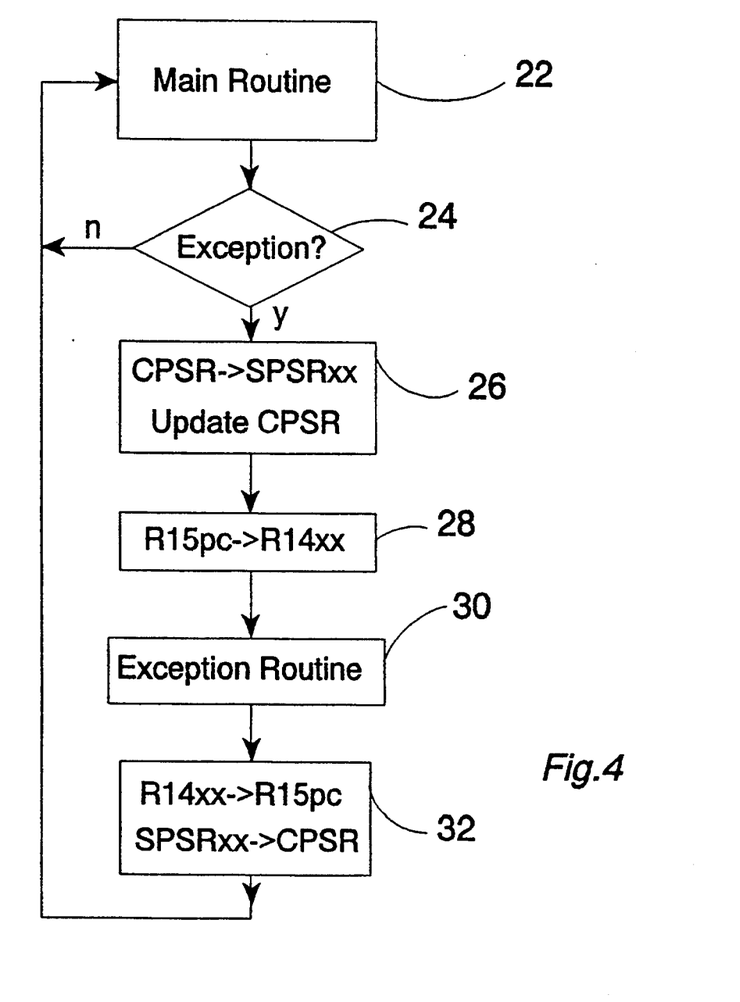
FIG. 4 shows a flow diagram illustrating the switch between a main processing routine and an exception processing routine.
Figure 4A:
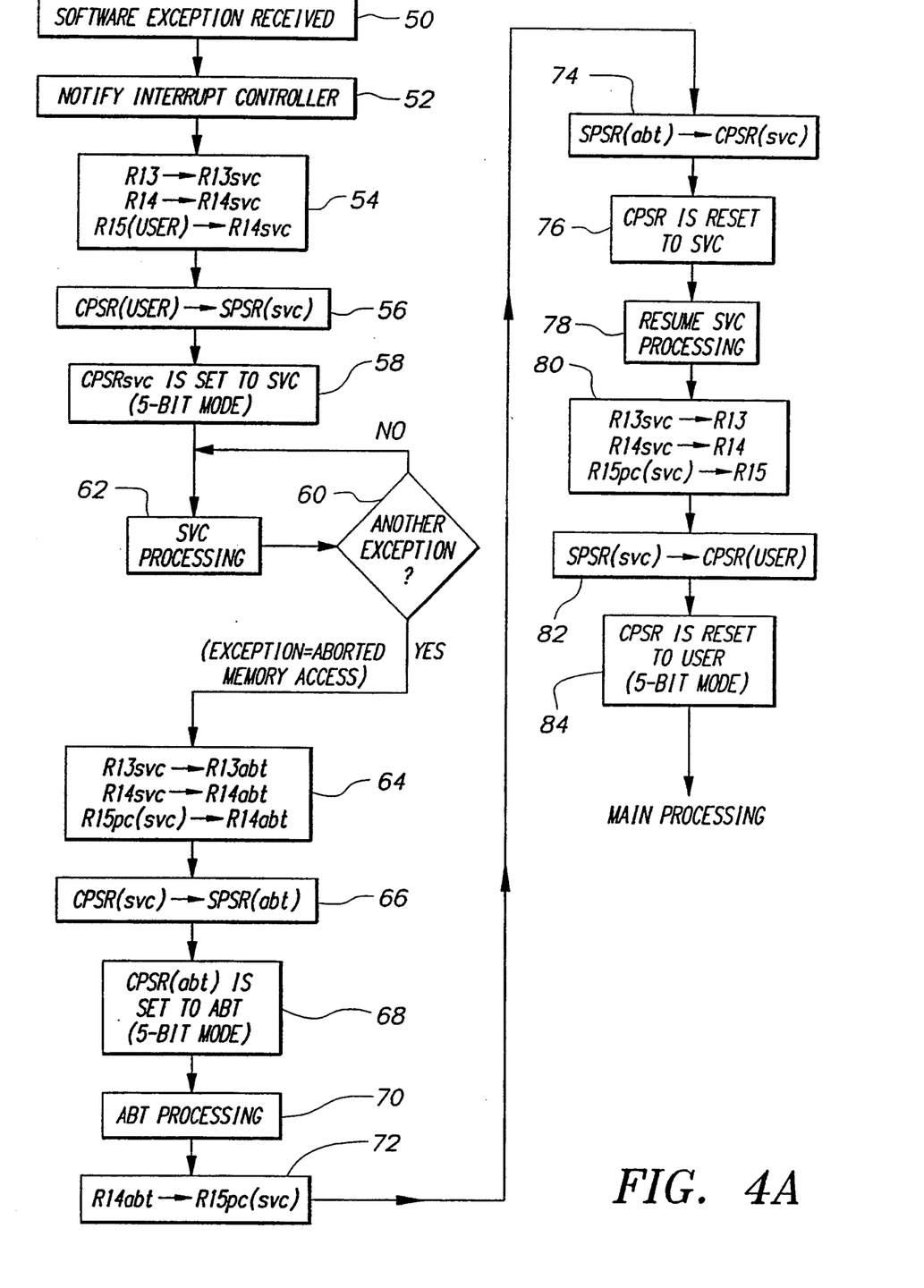
FIG. 4A shows a flow diagram illustrating an example of the system control process during the execution of embedded exception processing according to the present invention.

A detailed flow diagram showing the system control implemented according to this example is provided in FIG. 4A. As described above, instruction data including a software interrupt instruction is received from the external bus and eventually transferred to the instruction decoder. This is shown at step 50 of the flow diagram. Upon receipt of the software interrupt instruction, the instruction decoder notifies the interrupt controller at step 52. In this example, exception data registers R13svc and R14svc replace registers R13 and R14 respectively at step 54. The contents of R15pc from the User32 mode are saved in the R14svc register also at step 54. The contents of the CPSR from the User32 mode are saved in the SPSRsvc at step 56 and the contents of the CPSR updated to reflect the SVC32 mode which has been entered at step 58. In particular, the five bit field indicating the processing mode is updated. If, while in the SVC32 mode, a further exception occurs (steps 62) as determined at step 60, such as an aborted memory access, then the Abt32 mode is entered from the SVC32 mode.

In this case, the R13abt and R14abt registers replace the respective R13svc and R14svc registers of the SVC32 mode at step 64. The contents of the R15pc register current in the SVC32 mode are saved in the R14abt register also as step 64. As before, the contents of the CPSR in the SVC32 mode are saved in the SPSRabt at step 66. It should be understood that again the 5-bit mode in the CPSR is updated to reflect the Abt32 mode which has been entered.

When the exception handling is complete within the Abt32 mode (step 70), the CPU will restore the contents of R14abt to R15pc and the contents of SPSRabt to the CPSR at steps 72 and 74 respectively. Restoring the contents of the CPSR to the state they had when the SVC32 mode was last executed will change the 5 bit field indicating the mode back to indicating the SVC32 mode (step 76) which will automatically change the registers addressed such that the R13svc and R14svc registers are now addressed instead of the R13abt and R14abt registers. Since no processing has occurred upon the R13svc and R14svc registers since the SVC32 mode was exited, then the values within these registers will have been preserved. In combination with the fact that the contents of the R15pc are restored to that which they had when the SVC32 mode was exited, then the SVC32 mode processing will resume at step 78 at substantially the exact point at which it was exited (providing the contents of R0 to R12 have been restored if these were altered in the Abt32 mode).

In a similar way, when the SVC32 exception handling code has completed its task at step 78, the system will return to the User32 mode by substituting the R13 and R14 and R15 registers for the R13svc and R14svc registers at step 80. At the same time, the contents of the SPSRsvc will be restored to the CPSR at step 82. The CPSR 5-bit mode is then reset to reflect that the main processing mode has been entered as shown at step 84.

The overall effect of the above is that an abort exception is nested within a supervisor exception from the main processing mode User32. The use of the exception data registers to substitute for corresponding ones of the main data registers means that the switching between modes can be achieved at high speed. The provision of the saved programming status registers allows a seamless switching and return to be achieved with reduced programming overhead.

Figure 3:
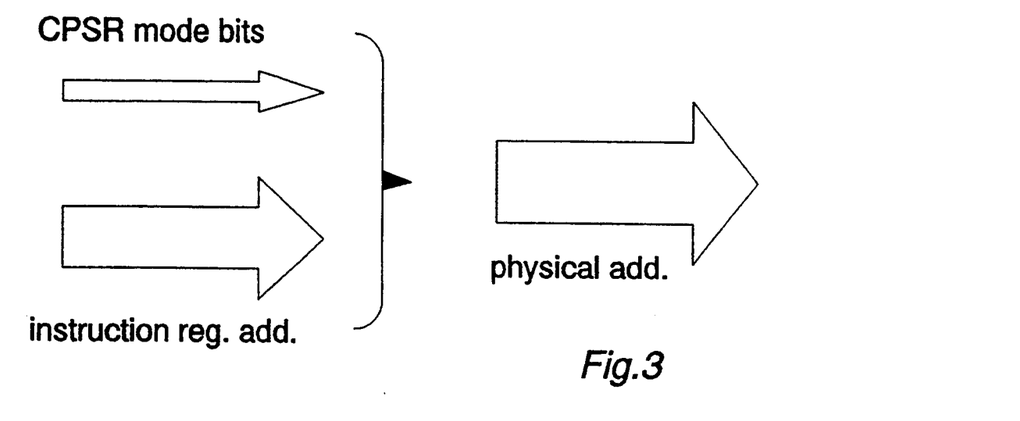
FIG. 3 illustrates how a physical register address is derived from mode bits from the programming status register and from the instruction being executed.

FIG. 3 illustrates how a physical register address identifying a particular one of the main data registers and the exception data registers is derived from a combination of the mode bits from the CPSR and an instruction register address as decoded by the instruction decoder 14 of FIG. 1. In fact, these various composite register addresses will be used as inputs to the register address decoder of the register bank rather than going through an intermediate stage of producing a physical register address.

FIG. 4 schematically illustrates the processing that occurs when moving between a main processing mode and an exception processing mode. The data processing apparatus is performing a main processing routine 22. A step 24 tests as to whether an exception has occurred. If no exception has occurred, then the main processing routine 22 continues. If an exception has occurred, then control passes to step 26.

In step 26 the contents of the CPSR are stored to the SPSR of the relevant exception mode that has been identified. The contents of the CPSR are then changed to reflect the new processing mode that has been entered. At step 28 the contents of the program counter R15pc from the previous mode are saved in the R14xx of the exception mode that has been entered. Steps 26 and 28 take place in response to a single instruction.

When the exception mode has been entered after step 28, the system executes an exception routine 30. At the end of the exception routine 30, the contents of the register R14xx are returned to the program counter R15pc and the programming status data of the previous mode is restored from the SPSRxx to the CPSR. This is step 32, after which a return is made to the main routine 22 at the point indicated by the newly restored R15pc.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus operable to manipulate data in either a main processing mode or an exception processing mode, said data processing apparatus comprising:

(i) a plurality of main data registers for holding data to be manipulated;

(ii) a processing status register for holding data indicative of processing status;

(iii) at least one exception data register;

(iv) a saved processing status register;

(v) address control means interfaced to said plurality of main data registers and said at least one exception data register for substituting the use of said at least one exception data register for a respective corresponding one of said main data registers upon entering said exception processing mode such that substantially all register accesses to said respective corresponding one of said main data registers are redirected to said at least one exception data register;

(vi) processing control means interfaced to said processing status register for storing in said saved processing status register said data indicative of processing status in said main processing mode upon entering said exception processing mode;

(vii) said address control means additionally returning for use said respective corresponding one of said main data registers in place of said at least one exception data register upon leaving said exception processing mode such that substantially all register accesses redirected to said at least one exception data register are directed back to said respective corresponding one of said main data registers; and (viii) said processing control means additionally restoring said data stored in said saved processing status register to said processing status register upon leaving said exception processing mode.

2. The data processing apparatus as claimed in claim 1, further comprising:

a program counter register for holding data indicative of program position within an executing program;

said processing control means being additionally interfaced to said program counter register and additionally storing said data indicative of program position within a currently executing program into one of said at least one exception data register serving as a return address register upon entering said exception handling mode; and said processing control means additionally restoring said data stored in said return address register to said program counter register upon leaving said exception processing mode.

3. The data processing apparatus as claimed in claim 1, wherein said plurality of main data registers include a main processing mode stack pointer register for holding data indicative of current address within a stack memory area used by said main processing mode and said at least one exception data register includes an exception processing mode stack pointer register for substituting for said main processing mode stack pointer register in said exception processing mode and for holding data indicative of current address within a stack memory area used by said exception processing mode.

4. The data processing apparatus as claimed in claim 1, wherein a plurality of exception processing modes are provided, each exception processing mode having at least one exception data register and a saved processing status register associated therewith.

5. The data processing apparatus as claimed in claim 4, wherein a change is made from operation in a first exception processing mode to operation in a second exception processing mode such that:

said address control means substitutes for use said at least one exception data register corresponding to said second processing mode for a respective main data register or exception data register currently in use; and said processing control means storing in said saved processing status register corresponding to said second processing mode said data indicative of processing status in said first exception processing mode.

6. The data processing apparatus as claimed in claim 1, wherein said exception processing mode is selected from the group comprising:

a fast interrupt request mode entered when an externally applied fast interrupt signal is detected and said fast interrupt mode is enabled;

a supervisor mode entered when said data processing apparatus is reset or upon execution of a software interrupt instruction;

an abort made entered when a memory access is aborted;

a slow interrupt request mode entered when an externally applied slow interrupt signal is detected and said slow interrupt mode is enabled; and an undefined mode entered when an undefined software instruction is encountered.

7. The data processing apparatus as claimed in claim 4, wherein said plurality of exception processing modes are selected from the group comprising:

a fast interrupt request mode entered when an externally applied fast interrupt signal is detected and said fast interrupt mode is enabled;

a supervisor mode entered when said data processing apparatus is reset or upon execution of a software interrupt instruction;

an abort mode entered when a memory access is aborted;

a slow interrupt request mode entered when an externally applied slow interrupt signal is detected and said slow interrupt mode is enabled; and an undefined mode entered when an undefined software instruction is encountered.

8. The data processing apparatus as claimed in claim 4, wherein said plurality of exception processing modes include one or more high speed exception processing modes and one or more low speed exception processing modes, said one or more high speed exception processing modes having a greater number of associated exception data registers to be made directly available for use upon entering said one or more high speed exception processing modes than said one or more low speed exception processing modes.

9. The data processing apparatus as claimed in claim 8, comprising a write buffer into which data from said main data registers may be written prior to storage elsewhere, said write buffer having a data storage capacity equal to or greater than an amount of data contained within those main data registers not substituted with exception data registers in said one or more high speed exception processing modes.

10. The data processing apparatus as claimed in claim 9, comprising means for reading from a plurality of main data registers and exception data registers in response to single store multiple software instruction and means for writing to a plurality of main data registers and exception data registers in response to single load multiple software instruction.

11. The data processing apparatus as claimed in claim 8, wherein said one or more high speed exception processing modes commence exception handling code execution directly from an exception vector.

12. The data processing apparatus as claimed in claim 1, wherein said main data registers and said exception data registers are addressed using a register address formed from an instruction portion derived from an executed software instruction and a mode portion derived from at least some bits of said data indicative of processing status stored in said processing status register.

13. A method of operating a data processing apparatus to manipulate data in either a main processing mode or an exception processing mode, said data processing apparatus comprising: a plurality of main data registers for holding data to be manipulated; a processing status register for holding data indicative of processing status; at least one exception data register; and a saved processing status register; said method comprising the steps of:
 (i) substituting the use of said at least one exception data register for a respective corresponding one of said main data registers upon entering said exception processing mode such that substantially all register accesses to said respective corresponding one of said main data registers are redirected to said at least one exception data register;
 (ii) storing in said saved processing status register said data indicative of processing status in said main processing mode upon entering said exception processing mode;
 (iii) returning for use said respective corresponding one of said main data registers in place of said at least one exception data register upon leaving said exception processing mode such that substantially all register accesses redirected to said at least one exception data register are directed back to said respective corresponding one of said main data registers; and
 (iv) restoring said data stored in said saved processing status register to said processing status register upon leaving said exception processing mode.

14. A data processing apparatus operable to manipulate data in either a main processing mode or one of a plurality of exception processing modes, said plurality of exception processing modes include one or more high speed exception processing modes and one or more low speed exception processing modes, said data processing apparatus comprising:
 (i) a plurality of main data registers for holding data to be manipulated;
 (ii) a processing status register for holding data indicative of processing status;
 (iii) at least one exception data register associated with each exception processing mode;
 (iv) a saved processing status register associated with each exception processing mode;
 (v) address control means interfaced to said plurality of main data registers and said at least one exception data register for substituting the use of said at least one exception data register for a respective corresponding one of said main data registers upon entering one of said associated exception processing modes such that substantially all register accesses to said respective corresponding one of said main data registers are redirected to said at least one exception data register, said one or more high speed exception processing modes having a greater number of associated exception data registers to be made directly available for use upon entering said one or more high speed exception processing modes than said one or more low speed exception processing modes;
 (vi) processing control means interfaced to said processing status register for storing in said saved processing status register said data indicative of processing status in said main processing mode upon entering said one associated exception processing mode;
 (vii) said address control means additionally returning for use said respective corresponding one of said main data registers in place of said at least one exception data register upon leaving said one associated exception processing mode such that substantially all register accesses redirected to said at least one exception data register are directed back to said respective corresponding one of said main data registers; and
 (viii) said processing control means additionally restoring said data stored in said saved processing status register to said processing status register upon leaving said one associated exception processing mode.

15. The data processing apparatus as claimed in claim 14, further comprising:
 a program counter register for holding data indicative of program position within an executing program;
 said processing control means being additionally interfaced to said program counter register and additionally storing said data indicative of program position within a currently executing program into one of said at least one exception data register serving as a return address register upon entering said exception handling mode; and
 said processing control means additionally restoring said data stored in said return address register to said program counter register upon leaving said exception processing mode.

16. The data processing apparatus as claimed in claim 14, wherein said plurality of main data registers include a main processing mode stack pointer register for holding data indicative of current address within a stack memory area used by said main processing mode and said at least one exception data register includes an exception processing mode stack pointer register for substituting for said main processing mode stack pointer register in said exception processing mode and for holding data indicative of current address within a stack memory area used by said exception processing mode.

17. The data processing apparatus as claimed in claim 14, wherein a change is made from operation in a first exception processing mode to operation in a second exception processing mode such that:
 said address control means substitutes for use said at least one exception data register corresponding to said second processing mode for a respective main data register or exception data register currently in use; and
 said processing control means storing in said saved processing status register corresponding to said second processing mode said data indicative of processing status in said first exception processing mode.

18. The data processing apparatus as claimed in claim 14, wherein said plurality of exception processing modes are selected from the group comprising:

a fast interrupt request mode entered when an externally applied fast interrupt signal is detected and said fast interrupt mode is enabled;

a supervisor mode entered when said data processing apparatus is reset or upon execution of a software interrupt instruction;

an abort mode entered when a memory access is aborted;

a slow interrupt request mode entered when an externally applied slow interrupt signal is detected and said slow interrupt mode is enabled; and an undefined mode entered when an undefined software instruction is encountered.

19. The data processing apparatus as claimed in claim 14, comprising a write buffer into which data from said main data registers may be written prior to storage elsewhere, said write buffer having a data storage capacity equal to or greater than an amount of data contained within those main data registers not substituted with exception data registers in said one or more high speed exception processing modes.

20. The data processing apparatus as claimed in claim 19, comprising means for reading from a plurality of main data registers and exception data registers in response to single store multiple software instruction and means for writing to a plurality of main data registers and exception data registers in response to single load multiple software instruction.

21. The data processing apparatus as claimed in claim 14, wherein said one or more high speed exception processing modes commence exception handling code execution directly from an exception vector.

22. The data processing apparatus as claimed in claim 14, wherein said main data registers and said exception data registers are addressed using a register address formed from an instruction portion derived from an executed software instruction and a mode portion derived from at least some bits of said data indicative of processing status stored in said processing status register.

* * * * *